US 9,590,884 B2

(12) United States Patent
Toksvig et al.

(10) Patent No.: US 9,590,884 B2
(45) Date of Patent: Mar. 7, 2017

(54) NATIVE APPLICATION HOTSPOT

(71) Applicant: Facebook, Inc., Menlo Park, CA (US)

(72) Inventors: Michael John McKenzie Toksvig, Palo Alto, CA (US); Charles J. Hughes, Palo Alto, CA (US); Erick Tseng, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 242 days.

(21) Appl. No.: 13/935,216

(22) Filed: Jul. 3, 2013

(65) Prior Publication Data
US 2015/0012640 A1  Jan. 8, 2015

(51) Int. Cl.
*H04W 12/06* (2009.01)
*G06F 21/30* (2013.01)
(Continued)

(52) U.S. Cl.
CPC .......... *H04L 43/0876* (2013.01); *G06F 21/41* (2013.01); *G06F 21/44* (2013.01);
(Continued)

(58) Field of Classification Search
CPC ..... H04W 12/00–12/12; H04W 84/12; H04W 63/08; H04W 48/00–48/20;
(Continued)

(56) References Cited

U.S. PATENT DOCUMENTS 7,231,661 B1 * 6/2007 Villavicencio .......... G06F 21/41
709/225
7,234,158 B1 * 6/2007 Guo .................... H04L 63/0815
709/229
(Continued)

FOREIGN PATENT DOCUMENTS

JP   2012-515956 A   7/2012
KR   10-0566632     3/2006
(Continued)

OTHER PUBLICATIONS

International Search Report and Written Opinion for International Application PCT/US2014/044779, Oct. 15, 2014.
(Continued)

*Primary Examiner* — David Lazaro
*Assistant Examiner* — Julian Chang
(74) *Attorney, Agent, or Firm* — Baker Botts L.L.P.

(57) ABSTRACT

In one embodiment, a method includes detecting interception of data sent by the computing device to a first network resource through a communication network. The first network resource corresponds to a particular domain of the communication network. The method also includes determining whether the communication network is administered by the particular domain; and automatically generating a request to access the communication network that identifies a second network resource based at least in part on the determination. The second network resource is configured to authenticate a user to the particular domain of the communication network. The method also includes sending the request to the second network resource to access the communication network.

24 Claims, 8 Drawing Sheets

(51) Int. Cl.
  *H04L 12/26* (2006.01)
  *H04L 29/06* (2006.01)
  *H04W 4/20* (2009.01)
  *G06F 21/41* (2013.01)
  *G06F 21/44* (2013.01)
  *H04L 29/08* (2006.01)
  *H04W 88/08* (2009.01)

(52) U.S. Cl.
  CPC .......... *H04L 63/08* (2013.01); *H04L 63/0884* (2013.01); *H04L 63/10* (2013.01); *H04L 67/02* (2013.01); *H04W 4/206* (2013.01); *H04W 88/08* (2013.01)

(58) Field of Classification Search
  CPC ...... H04W 88/08–88/12; H04W 88/16; G06Q 50/01; H04L 63/08; H04L 63/10; H04L 63/20; H04L 63/0892; H04L 63/0815; H04L 63/0884; H04L 63/0876; G06F 21/30–21/46
  See application file for complete search history.

(56) References Cited

U.S. PATENT DOCUMENTS

| | | | |
|---|---|---|---|
| 7,356,694 B2* | 4/2008 | Mayo ................ H04L 63/0815 713/159 |
| 8,448,072 B1* | 5/2013 | Lai et al. ....................... 715/753 |
| 8,479,263 B1 | 7/2013 | Liu et al. |
| 8,554,670 B1* | 10/2013 | Blank et al. ..................... 705/39 |
| 8,594,628 B1* | 11/2013 | Schroeder et al. ........... 455/411 |
| 9,332,054 B2* | 5/2016 | Wilson ................ H04L 67/02 |
| 2002/0023059 A1* | 2/2002 | Bari et al. ...................... 705/76 |
| 2002/0091798 A1* | 7/2002 | Joshi ................ G06F 17/30867 709/219 |
| 2002/0099809 A1 | 7/2002 | Lee |
| 2002/0112083 A1* | 8/2002 | Joshi ................ G06F 17/30876 709/248 |
| 2002/0112155 A1* | 8/2002 | Martherus ............... G06F 21/41 713/155 |
| 2002/0120599 A1* | 8/2002 | Knouse ............ G06F 17/30867 |
| 2002/0129024 A1* | 9/2002 | Lee ......................... G06F 21/41 |
| 2002/0147813 A1* | 10/2002 | Teng ........................ G06F 21/41 709/225 |
| 2003/0074580 A1* | 4/2003 | Knouse .............. H04L 63/0815 726/4 |
| 2003/0105862 A1* | 6/2003 | Villavicencio .......... H04L 63/08 709/225 |
| 2008/0271120 A1* | 10/2008 | Parkes et al. ..................... 726/3 |
| 2009/0187983 A1* | 7/2009 | Zerfos et al. .................... 726/10 |
| 2009/0327690 A1* | 12/2009 | Landfeldt et al. ............ 713/150 |
| 2010/0235895 A1* | 9/2010 | Grassley et al. ................ 726/7 |
| 2010/0296441 A1* | 11/2010 | Barkan .................. H04W 12/08 370/328 |
| 2011/0040867 A1* | 2/2011 | Kalbag .......................... 709/224 |
| 2011/0202986 A1* | 8/2011 | Horn et al. ........................ 726/7 |
| 2011/0235802 A1* | 9/2011 | Kokkinen et al. ............. 380/247 |
| 2011/0258303 A1* | 10/2011 | Nath et al. ..................... 709/223 |
| 2011/0265172 A1* | 10/2011 | Sharma ............... H04L 63/0815 726/8 |
| 2011/0310787 A1* | 12/2011 | Sheriff et al. .................. 370/315 |
| 2012/0078726 A1* | 3/2012 | Black et al. ............... 705/14.66 |
| 2012/0110640 A1* | 5/2012 | Donelson et al. ................ 726/3 |
| 2012/0124176 A1* | 5/2012 | Curtis et al. .................... 709/219 |
| 2012/0192258 A1* | 7/2012 | Spencer et al. ................... 726/7 |
| 2012/0210011 A1* | 8/2012 | Liu et al. ....................... 709/229 |
| 2012/0233158 A1* | 9/2012 | Braginsky et al. ........... 707/724 |
| 2012/0262112 A1* | 10/2012 | Ross ................................ 320/109 |
| 2012/0266229 A1* | 10/2012 | Simone et al. ..................... 726/9 |
| 2012/0322505 A1* | 12/2012 | Lodeweyckx ................ 455/558 |
| 2013/0007868 A1* | 1/2013 | Hoggan et al. ................... 726/8 |
| 2013/0013553 A1* | 1/2013 | Stibel et al. .................. 707/602 |
| 2013/0067081 A1* | 3/2013 | Liu et al. ....................... 709/225 |
| 2013/0111024 A1 | 5/2013 | Setia et al. |
| 2013/0155876 A1* | 6/2013 | Potra et al. .................... 370/248 |
| 2013/0159079 A1* | 6/2013 | Singh et al. ............... 705/14.19 |
| 2013/0167196 A1* | 6/2013 | Spencer et al. ................... 726/3 |
| 2013/0198383 A1* | 8/2013 | Tseng et al. .................. 709/225 |
| 2013/0247164 A1* | 9/2013 | Hoggan ................ H04W 12/06 726/8 |
| 2013/0268666 A1* | 10/2013 | Wilson et al. ................. 709/225 |
| 2013/0326587 A1* | 12/2013 | Zhu et al. .......................... 726/3 |
| 2013/0332848 A1* | 12/2013 | Lam et al. ..................... 715/751 |
| 2014/0047510 A1* | 2/2014 | Belton ...................... H04L 9/32 726/4 |
| 2014/0068261 A1* | 3/2014 | Malek et al. .................. 713/168 |
| 2014/0081882 A1* | 3/2014 | Govindaraman ............. 705/319 |
| 2014/0086226 A1* | 3/2014 | Zhao et al. .................... 370/338 |
| 2014/0114738 A1* | 4/2014 | Tseng et al. ................ 705/14.27 |
| 2014/0133530 A1* | 5/2014 | Maguire ........................ 375/219 |
| 2014/0146787 A1* | 5/2014 | Cherian et al. ................ 370/331 |
| 2014/0179271 A1* | 6/2014 | Guccione et al. ............. 455/410 |
| 2014/0181894 A1* | 6/2014 | Von Bokern et al. ............ 726/1 |
| 2014/0189808 A1* | 7/2014 | Mahaffey ............ H04L 63/0853 726/4 |
| 2014/0195380 A1* | 7/2014 | Jamtgaard et al. ........ 705/26.61 |
| 2014/0236760 A1* | 8/2014 | Ishikawa et al. ............. 705/26.8 |
| 2014/0239733 A1* | 8/2014 | Mach et al. .................... 307/104 |
| 2014/0259147 A1* | 9/2014 | L'Heureux et al. ........... 726/14 |
| 2014/0282016 A1* | 9/2014 | Hosier, Jr. ..................... 715/733 |
| 2014/0310774 A1* | 10/2014 | Etchegoyen ..................... 726/3 |
| 2014/0342661 A1* | 11/2014 | DeLuca et al. ................ 455/39 |
| 2014/0344707 A1* | 11/2014 | Zhang et al. .................. 715/747 |
| 2014/0365644 A1* | 12/2014 | Tanaka et al. ................. 709/224 |
| 2015/0012970 A1* | 1/2015 | Toksvig et al. ..................... 726/3 |
| 2015/0052192 A1* | 2/2015 | Chauhan ....................... 709/203 |
| 2015/0074560 A1* | 3/2015 | Conley et al. ................ 715/758 |

FOREIGN PATENT DOCUMENTS

| | | |
|---|---|---|
| KR | 10-2006-0046066 | 5/2006 |
| KR | 10-2012-0105592 | 9/2012 |
| WO | WO 2013/072046 A1 | 5/2013 |
| WO | WO 2013/096146 A1 | 6/2013 |

OTHER PUBLICATIONS

Notice of Allowance, Korean Intellectual Property Office, Application No. 10-2016-7002939 (with English translation).
Japanese Office Action received from the Japanese Patent Office for Japanese Patent Application No. 2016-524278.

* cited by examiner

NATIVE APPLICATION HOTSPOT

TECHNICAL FIELD

This disclosure generally relates to communication networks.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a computing device may connect to a communication network through a native application. The application sends a request to a particular IP address or URL that bypasses the default captive portal behavior. If a particular application associated with a particular network resource of a particular domain is running prior to connecting a communication network, a dialog on the application may be presented that informs the user that particular application is associated with the communication network (e.g. WI-FI network). and connect the computing device to a particular website associated with the particular application without performing a communication network log on (i.e. captive portal) process. The application may send request to a gateway IP address that includes the particular endpoint of the router. The particular website may determine the user is accessing a portal of the particular communication network if the request to the particular URL or IP address exists (i.e. returns a success code e.g. 200). The user may "check-in" at the physical location associated with the router and the application may automatically send a request to connect the computing device to the communication network based the IP address of the router being associated with the particular communication network. In particular embodiments, the application may provide a business associated with the particular router as a top choice of a list of possible "check-in" locations.

DESCRIPTION OF EXAMPLE EMBODIMENTS

Figure 1:
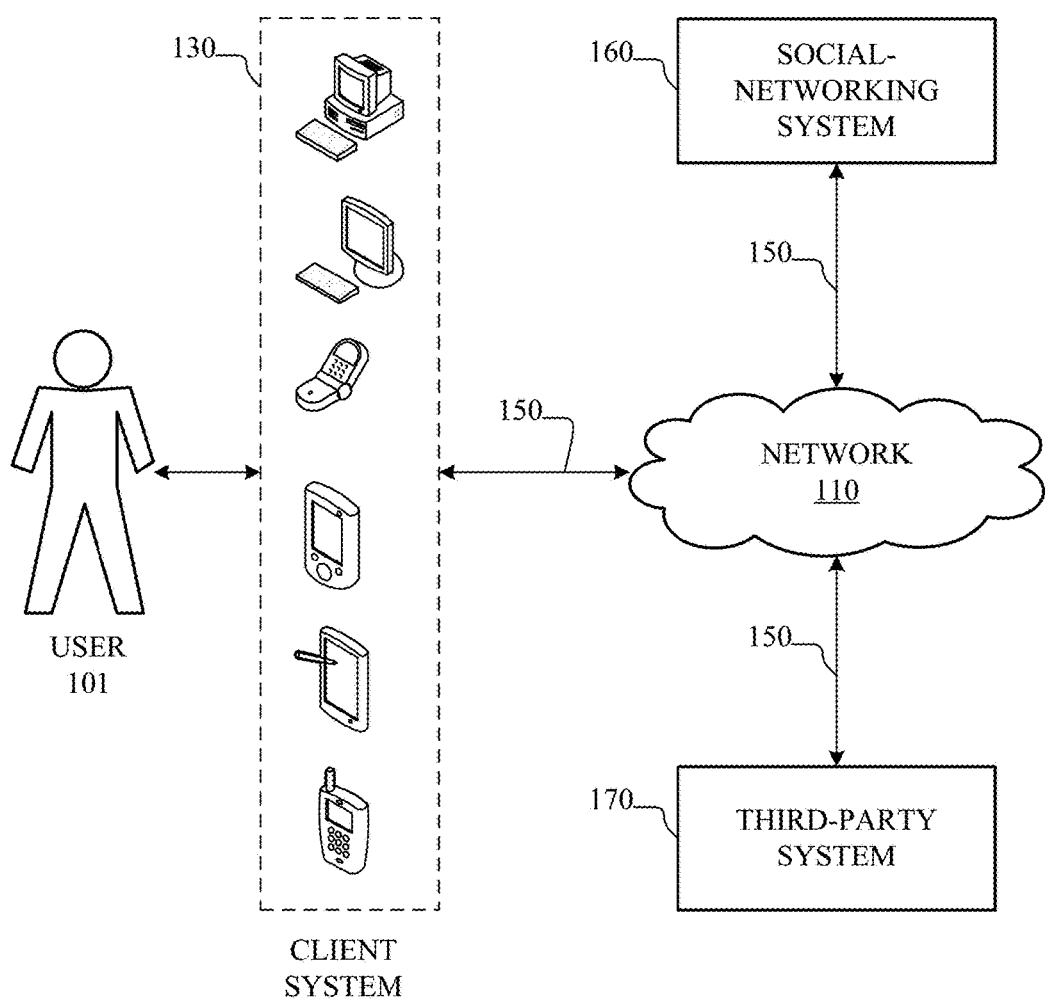
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example WI-FI or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, a communication network 110 may host a web portal or a "captive portal" in a network resource (e.g. gateway or server) that prevents access to the Internet (or other communication network 110) until user 101 of client system 130 has performed authentication, typically through entering payment information or login or password credentials or agreeing to a network administrator's terms of service. Herein, reference to accessing the Internet may refer to accessing any suitable domain, such as for example a second-level domain (SLD) of the Internet (e.g. www.FACEBOOK.com) through a user agent. Captive-portal techniques may force a user agent (e.g. Hyper Text Transfer Protocol (HTTP) client) connected to communication network 110 to be presented with a network-access page (usually for authentication purposes) prior to providing access to the Internet. A captive portal may turn a user agent (e.g. web browser) executed on client system 130 into an authentication device. As an example and not by way of limitation, the captive-portal authentication process may be performed by intercepting all data packets sent by client system 130, regardless of address or port, until user 101 opens a user agent, such as for example a web browser, and attempts to access the Internet. At that time, the user agent of client system 130 may be redirected to a particular network-access page that may require authentication or payment or displays an acceptable use policy that user 101 must agree to. Until successful authentication, client system 130 may be "trapped" in the captive portal's "walled garden." Captive portals are often used at WI-FI hotspots and may be used to control wired access (e.g. in apartment houses, hotel rooms, business centers, or "open" Ethernet jacks) as well. Captive portals may use a wide variety of packet-interception techniques, such as HTTP redirect, Internet protocol (IP) Redirect, and domain name server (DNS) Redirect.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, global positioning system (GPS) device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable user 101 to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as a server of social-networking system 160 or a server associated with a third-party system 170), and the web browser 132 may generate a HTTP request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to user 101. As described above, the webpage may be a network-access page associated with a captive portal. This disclosure contemplates any suitable webpage files. As an example and not by way of limitation, webpages may render from HTML files, Extensible HTML (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may include one or more network resources, such as for example servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by user 101. In addition or as an alternative, an advertisement may be one or more sponsored stories (e.g., a news-feed or ticker item on social-networking system 160). A sponsored story may be a social action by user 101 (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of user 101 or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a graphical user interface (GUI) of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before user 101 may access a page or utilize an application. User 101 may, for example view the advertisement through a web browser.

User 101 may interact with an advertisement in any suitable manner. User 101 may click or otherwise select the advertisement. By selecting the advertisement, user 101 may be directed to (or a browser or other application being used by user 101) a page associated with the advertisement. At the page associated with the advertisement, user 101 may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that user 101 may interact with. As an example and not by way of limitation, an advertisement may enable user 101 to "like" or otherwise endorse the advertisement by selecting an icon or link associated with endorsement. As another example and not by way of limitation, an advertisement may enable user 101 to search (e.g., by executing a query) for content related to the advertiser. Similarly, user 101 may share the advertisement with another user (e.g., through social-networking system 160) or RSVP (e.g., through social-networking system 160) to an event associated with the advertisement. In addition or as an alternative, an advertisement may include social-networking-system context directed to user 101. As an example and not by way of limitation, an advertisement may display information about a friend of the user within social-networking system 160 who has taken an action associated with the subject matter of the advertisement.

As described below, user 101 may be automatically "checked in" at a geolocation of an entity (e.g. a business) based at least in part on activity of user 101 through routers of communication network 110 administered by an entity (e.g. social-networking system 160) unaffiliated with the entity (e.g. the business) owning communication network 110. In particular embodiments, the entity owning communication network 110 may provide offers or discounts to users 101 that "check in" at the geolocation through communication network 110. As an example and not by way of limitation, social-networking system 160 may administer the communication network 110 and provide advertising, described above, of the business owning communication network 110 at no cost. Furthermore, payments may be made by the business to social-networking system 160 based at least in part on sending advertisements to user 101 and user 101 subsequently "checking in" at the geolocation through communication network 110. In particular embodiments, user 101 subsequently "checking in" at the geolocation may be an indication of a conversion from reading the advertisements to being a customer of the business and may provide evidence that user 101 is physically present at the geolocation.

Figure 2:
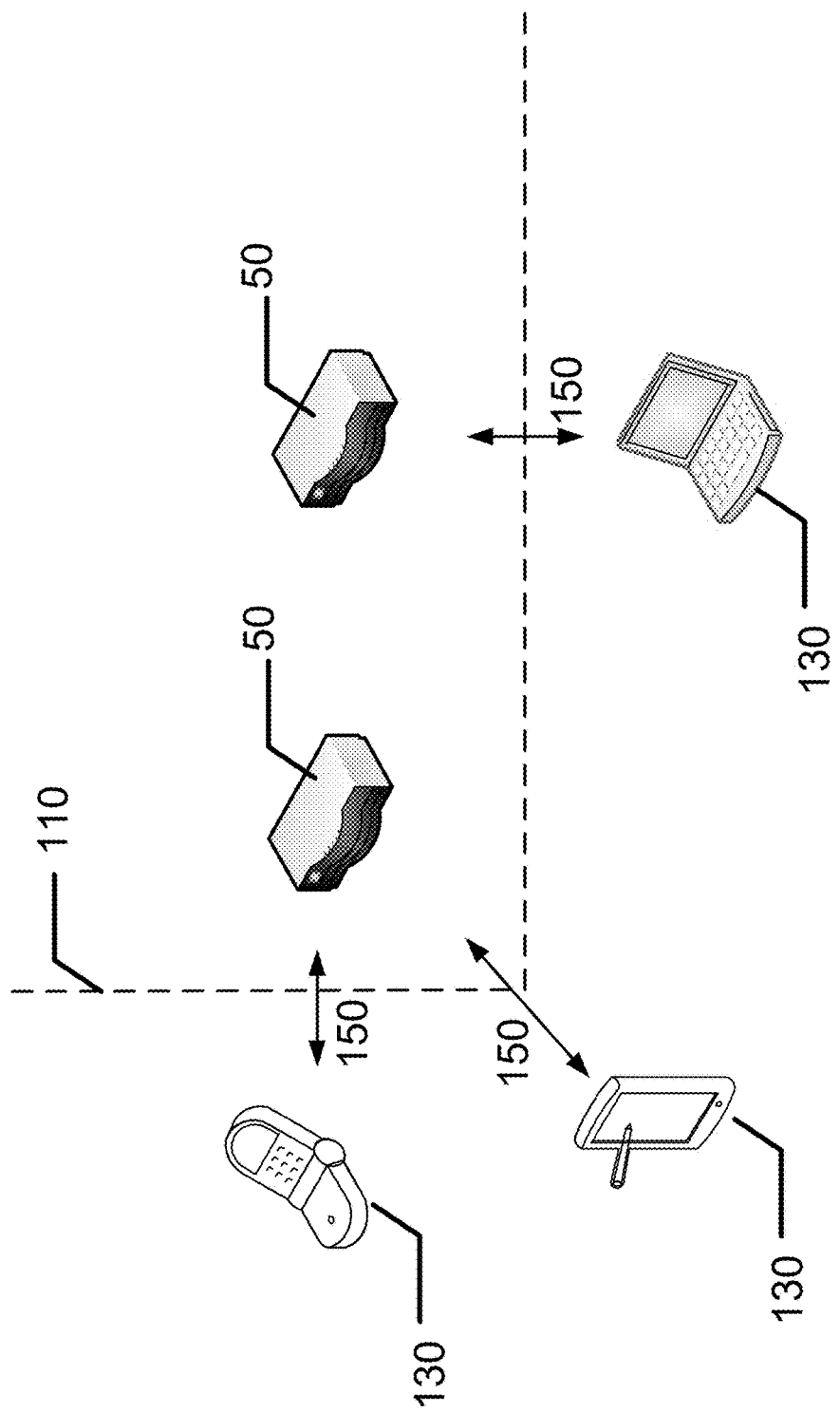
FIG. 2 illustrates an example portion of an example communication network.

FIG. 2 illustrates an example portion of an example communication network. In particular embodiments, a communication network 110 administered by a computer system may include one or more routers 50. Although FIG. 2 describes and illustrates a particular communication network with a particular arrangement of client systems and routers, this disclosure contemplates any suitable communication network with any suitable arrangement of routers and client systems. As an example and not by way of limitation, the computer system administering communication network 110 may be a computing infrastructure and platform that may include one or more components for computing, storage, networking, or any combination thereof. In particular embodiments, the computer system administering communication network 110 may be unaffiliated with the particular entity that owns communication network 110. As an example and not by way of limitation, communication network 110 may be a LAN, such as for example a WI-FI network, and routers 50 of communication network 110 may be located at a geolocation associated with the particular entity, such as for example a business.

Access to a WAN, such as for example the Internet, may be provided to one or more client systems 130 through communication network 110. As an example and not by way of limitation, one or more client systems 130 may access the Internet through routers 50 of communication network 110 of the particular entity, such as for example an airport authority, that is administered, such as for example by BOINGO. As another example, the particular entity may correspond to a particular SLD corresponding to a particular entity, such as for example a social-networking system described above. Access to communication network 110 may be provided in response to a user performing a logon procedure when connecting to communication network 110 through client system 130. As an example and not by way of limitation, the logon procedure may include obtaining a login code, providing an e-mail address associated with the user, performing a "check in" at a geolocation associated with the particular entity, or any combination thereof, through a network-access page described above. In particular embodiments, the user agent of client system 130 may be directed to a network resource (e.g. server) of the computer system, such as for example a social-networking system, in response to connecting to communication network 110 through client system 130. As an example and not by way of limitation, a user agent may be a software client that may operate on behalf of the user, such as for example, a web browser or e-mail client.

As described above, connecting client systems 130 may be performed through a captive portal of communication network 110. In particular embodiments, a default behavior of a dialog process associated with connecting to communication network 110 may be modified by a network administrator. Client systems 130 connecting to communication network 110 may send a request to one of routers 50 to allow the connection. As an example and not by way of limitation, the request may be a HTTP request to a particular URL accessible through the Internet. Furthermore, request may be sent through a user agent (e.g. web browser) executed on client system 130. As described above, routers 50 of communication network 110 may block the HTTP request in the "walled garden" of the captive portal. Upon detecting that the WI-FI connection is functioning as a captive portal (e.g. trapped in the walled garden of a captive portal), client system 130 may launch a web view that includes a network-access page of the captive portal. In particular embodiments, routers 50 of communication network 110 may include a reference to a particular endpoint, such as for example a particular IP address or URL, that is checked by an application or web browser as described below. As an example and not by way of limitation, client system 130 may be connected to communication network 110 based at least in part on a HTTP request being directed to the IP address or URL of a network resource configured to provide access to a particular domain of the communication network, as described below.

Figure 3:
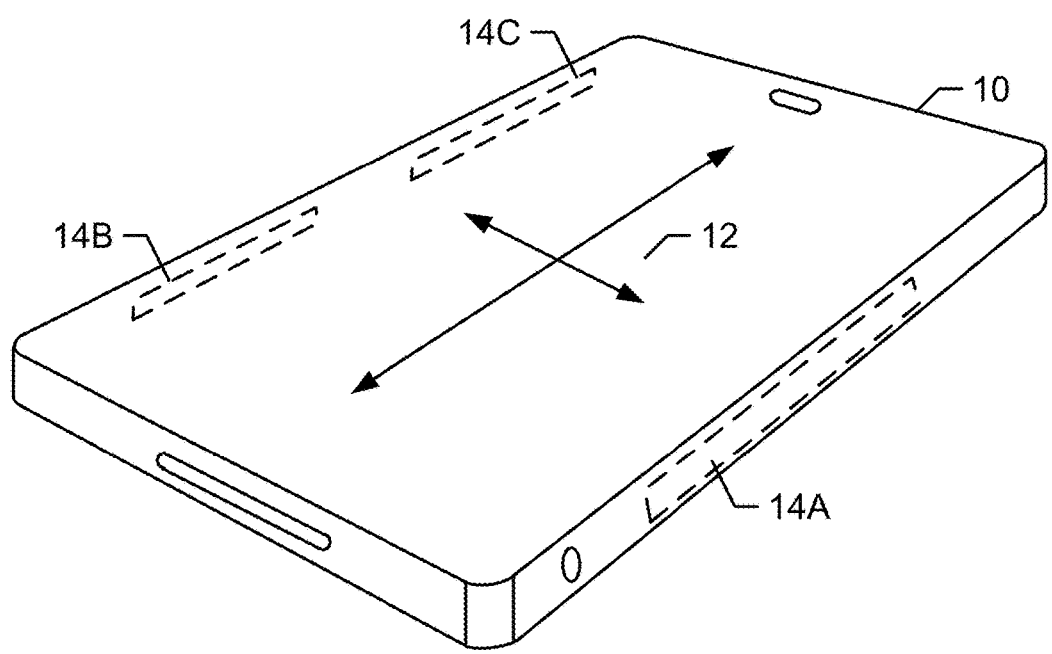
FIG. 3 illustrates an example mobile computing device.

FIG. 3 illustrates an example mobile computing device. In particular embodiments, a client system, described above, may be a mobile computing device 10. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a touch sensor 12 as an input component. In the example of FIG. 3, touch sensor 12 is incorporated on a front surface of mobile device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile computing device 10 many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable communication network and any suitable communication component for it. As an example and not by way of limitation, mobile computing device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile computing device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate.

As an example and not by way of limitation, mobile computing device 10 may connect to a communication network (e.g. WI-FI network) by executing the processes of a configuration pipeline of the operating system (OS) of mobile computing device 10. In particular embodiments, the configuration pipeline may support processes for configuring the wireless connection and may include several processes that are responsible for configuring the wireless connection, as well as capturing and executing a captive-portal prompt associated with particular communication networks. For example, the configuration pipeline may include a smart client that stores previously-used authentication credentials or cookies. In particular embodiments, configuration pipeline may include a process implementing International Roaming Access Protocols (IRAP). As an example and not by way of limitation, the user agent of mobile computing device 10 may send a HTTP request to the captive network support of the router of the communication network. As described above, a network-access page may be presented to a user on a display of mobile computing device 10 when establishing a connection with a router of the communication network. In particular embodiments, mobile computing device 10 may utilize a user agent, such as for example a web browser or native application, executed on mobile computing device 10 to access a communication network, such as for example a WI-FI network. In particular embodiments, the network-access page may include an information that indicates that network access is accomplished through the computer system (e.g. a social-networking system) administering the communication network.

In particular embodiments, the computer system administering the communication network may modify a default capture-portal behavior, described above. As described above, a HTTP request may be sent by a user agent of mobile computing device 10 to the captive portal to access a particular SLD through a WAN. As an example and not by way of example, the HTTP request may include a user agent string identifying the type of browser (e.g. SAFARI) of mobile computing device 10. As another example, the HTTP request may include a URL or an Internet Protocol (IP) address. In particular embodiments, the HTTP request from mobile computing device 10 may be redirected from the default network resource of the captive portal to the network resource configured to provide access to a particular domain, such as for example a SLD as described above. As an example and not by way of limitation, the redirection may be performed through a HTTP status code 302 redirect. In particular embodiments, the network resource of the particular domain may automatically and without user input provide input to emulate the requirements of the captive portal behavior, such as for example providing login or password credentials or agreeing to a network administrator's terms of service. As an example and not by way of limitation, the network resource of the particular domain may access one or more cookies stored on mobile computing device 10 associated with the particular domain. Furthermore, the computer system administering the communication network may connect the user to the particular domain of the communication network bypassing the captive network support of the router.

As described above, mobile computing device 10 may connect to a particular domain, such as for example www.FACEBOOK.com, of the communication network through an application executed on mobile computing device 10. In particular embodiments, the application may be configured to facilitate interaction between the particular domain of the communication network, such as for example a social-networking system. In particular embodiments, the application may detect data being sent (e.g. through a HTTP request) to a particular network resource of the communication network is being intercepted by the captive portal of the router of the communication network. Furthermore, the application may determine whether the communication network is administered by the particular domain (e.g. a social-networking system). In particular embodiments, the application may generate a request (e.g. HTTP request) that may include the particular IP address or URL of a network resource of the particular domain that is configured to authenticate the user to the particular domain associated with the application. In particular embodiments, the application of mobile computing device 10 may send the request to the IP address or URL of the network resource and a connection established to the communication network in response to the router returning a success code, such as for example HTTP status code 200. As an example and not by way of limitation, the application may be connected to the network resource of the particular domain through the communication network based at least in part on the HTTP request to the IP address of the authenticating network resource and an indication (e.g. a stored cookie) that the application is interacting with (e.g. logged on) the network resource of the particular domain. For example, mobile computing device 10 may receive access to the Internet through the communication network administered by a social-networking system based on the native application of mobile computing device 10 sending a HTTP request to the IP address or URL of an authentication server of the social-networking system and the application of the mobile computing device 10 being logged on the social-networking system.

In particular embodiments, a network resource of the particular domain may determine mobile computing device is located at a particular geolocation based at least in part on the IP address of the router providing the connection for mobile computing device 10 to the communication network. As an example and not by way of limitation, the user may manually "check in" on the social-networking system at a geolocation associated with the communication network through the native application. As another example, the computer system administering the communication network may automatically "check-in" the user at the geolocation based at least in part on the user interacting with the network resource of the particular domain through the router of the communication network administered by the particular domain. For example, the user may be automatically checked in at the geolocation associated with the communication network when the mobile computing device is within the range of or attempts to access the communication network through the routers.

Figure 4:
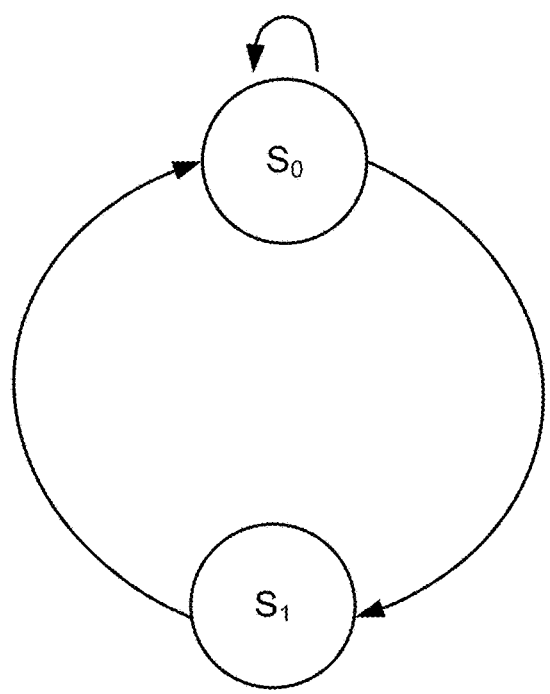
FIG. 4 illustrates an example state machine for modifying a captive portal behavior of a communication network.

FIG. 4 illustrates an example state diagram for modifying a captive portal behavior of a communication network. In particular embodiments, the modification of the captive-portal behavior described above may be implemented as a state machine 400. As an example and not by way of limitation, state machine 400 may emulate and modify the captive-portal behavior between the mobile computing device and the communication network. In particular embodiments, the router receiving the request from the mobile computing device may set a flag that corresponds to an initial state $S_0$ of state machine 400 that redirects the HTTP request sent by the mobile computing device. As an example and not by way of limitation, the flag may be associated with a media access control (MAC) address of mobile computing device 10. Furthermore, In particular embodiments, state $S_1$ of state machine 400 may modify the network-access page displayed on the mobile computing device to include a particular interactive element, such as for example a button, that may affect completion of the connection (e.g. providing login or password credentials or agreeing to a network administrator's terms of service) of the mobile computing device to the communication network. In particular embodiments, information displayed on the modified network-access page may include information regarding or a hyperlink to launch a particular application of the mobile computing device, such as for example an application associated with a social-networking system, and connect the user to the SLD associated with the application.

Figure 5:
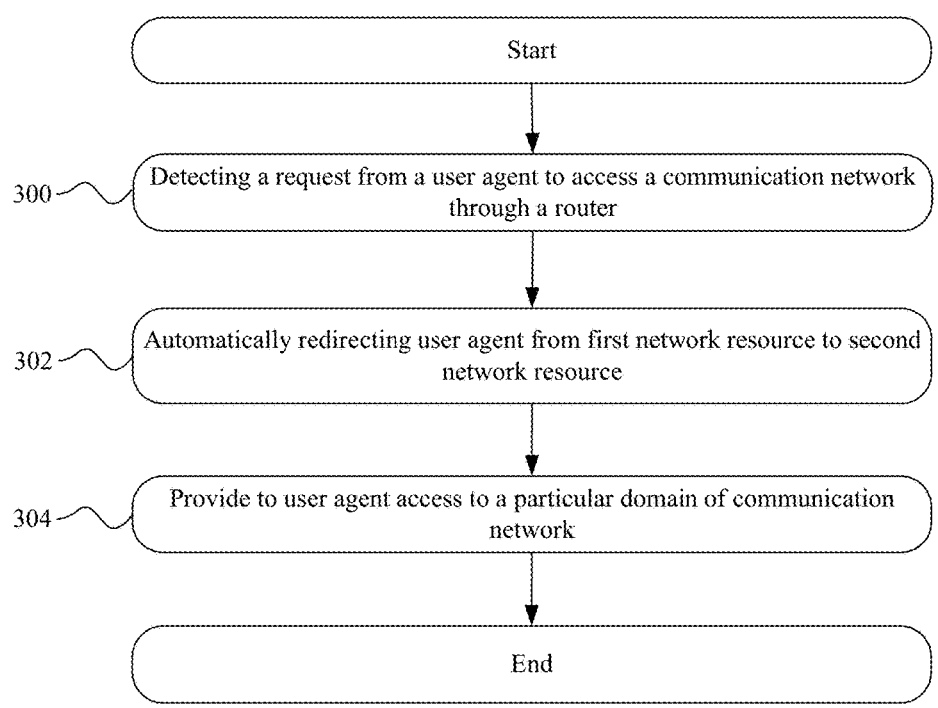
FIG. 5 illustrates an example method for modifying a captive portal behavior of a communication network.

FIG. 5 illustrates an example method for modifying a captive portal behavior of a communication network. The method may start at step 300, where a router detects a request from a user agent of a client computing device of a user to access a communication network through the router. In particular embodiments, the user agent may be a web browser of the client computing device. Step 302, by the router, automatically redirects the user agent from a first network resource to a second network resource. In particular embodiments, the first network resource is configured to authenticate the user to provide access to the communication network and the second network resource is configured to authenticate the user to provide access to a particular domain of the communication network. At step 304, the router provides to the user agent access to the particular domain of the communication network if the second network resource successfully authenticates the user, at which point the method may end. Although this disclosure describes and illustrates particular steps of the method of FIG. 5 as occurring in a particular order, this disclosure contemplates any suitable steps of the method of FIG. 5 occurring in any suitable order. Particular embodiments may repeat one or more steps of the method of FIG. 5, where appropriate. Moreover, although this disclosure describes and illustrates an example method for modifying a default captive portal behavior including the particular steps of the method of FIG. 5, this disclosure contemplates any suitable method for modifying a default captive portal behavior including any suitable steps, which may include all, some, or none of the steps of the method of FIG. 5, where appropriate. Furthermore, although this disclosure describes and illustrates particular components carrying out particular steps of the method of FIG. 5, this disclosure contemplates any suitable combination of any suitable components, such as for example a processor of a mobile computing device or a server of a computing system, carrying out any suitable steps of the method of FIG. 5.

Figure 6:
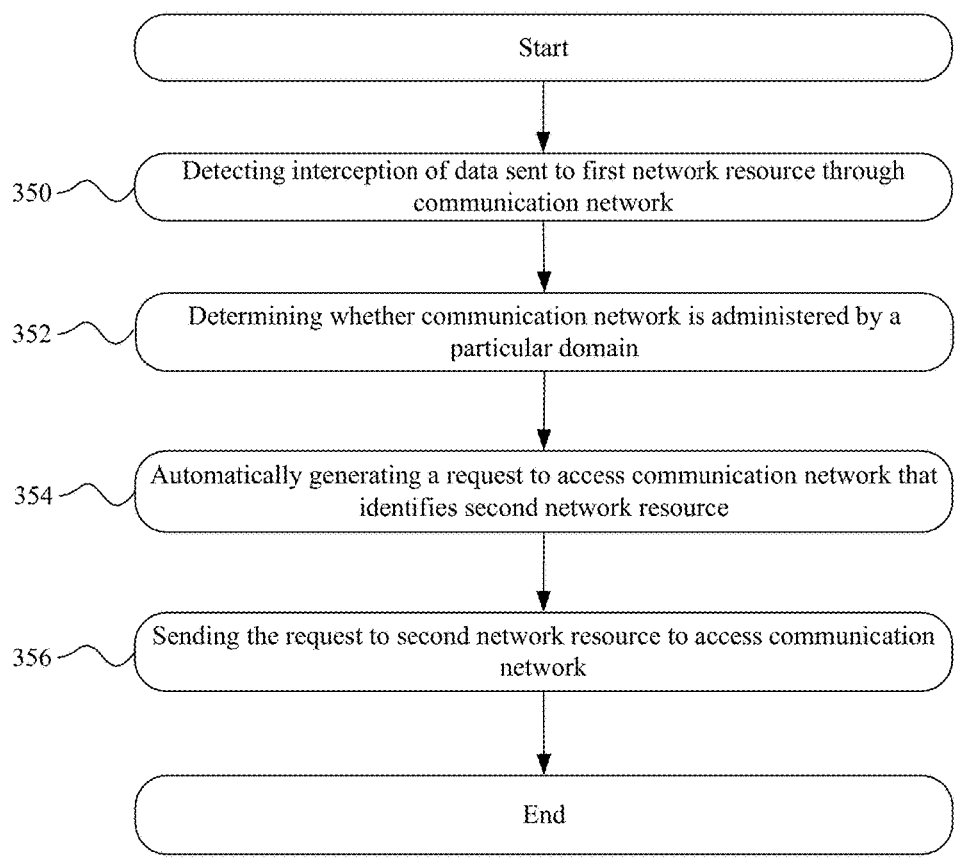
FIG. 6 illustrates an example method for connecting to a communication network administered by a particular domain.

FIG. 6 illustrates an example method for connecting to a communication network administered by a particular domain. The method may start at step 350, where a computing device detects interception of data sent by the computing device to a first network resource through a communication network. In particular embodiments, the sending of data and detection may be performed by an application of the computing device. In particular embodiments, the first network resource may be a server that corresponds to a particular domain of the communication network. Step 352, by the computing device, determining whether the communication network is administered by the particular domain. In particular embodiments, the communication network may be administered by an entity unaffiliated with the entity that owns the communication network. Step 354, by the computing device, automatically generating a request to access the communication network that identifies a second network resource based at least in part on the determination. In particular embodiments, the second network resource may be a server configured to authenticate a user to the particular domain of the communication network. In particular embodiments, a default request of the captive portal of the router is modified to include the URL or IP address of the second network resource. At step 354, the computing device sends the request to the second network resource to access the communication network, at which point the method may end. Although this disclosure describes and illustrates particular steps of the method of FIG. 6 as occurring in a particular order, this disclosure contemplates any suitable steps of the method of FIG. 6 occurring in any suitable order. Particular embodiments may repeat one or more steps of the method of FIG. 6, where appropriate. Moreover, although this disclosure describes and illustrates an example method for connecting to a communication network through an application including the particular steps of the method of FIG. 6, this disclosure contemplates any suitable method for connecting to a communication network through an application including any suitable steps, which may include all, some, or none of the steps of the method of FIG. 6, where appropriate. Furthermore, although this disclosure describes and illustrates particular components carrying out particular steps of the method of FIG. 6, this disclosure contemplates any suitable combination of any suitable components, such as for example a processor of a mobile computing device or a server of a computing system, carrying out any suitable steps of the method of FIG. 6.

Figure 7:
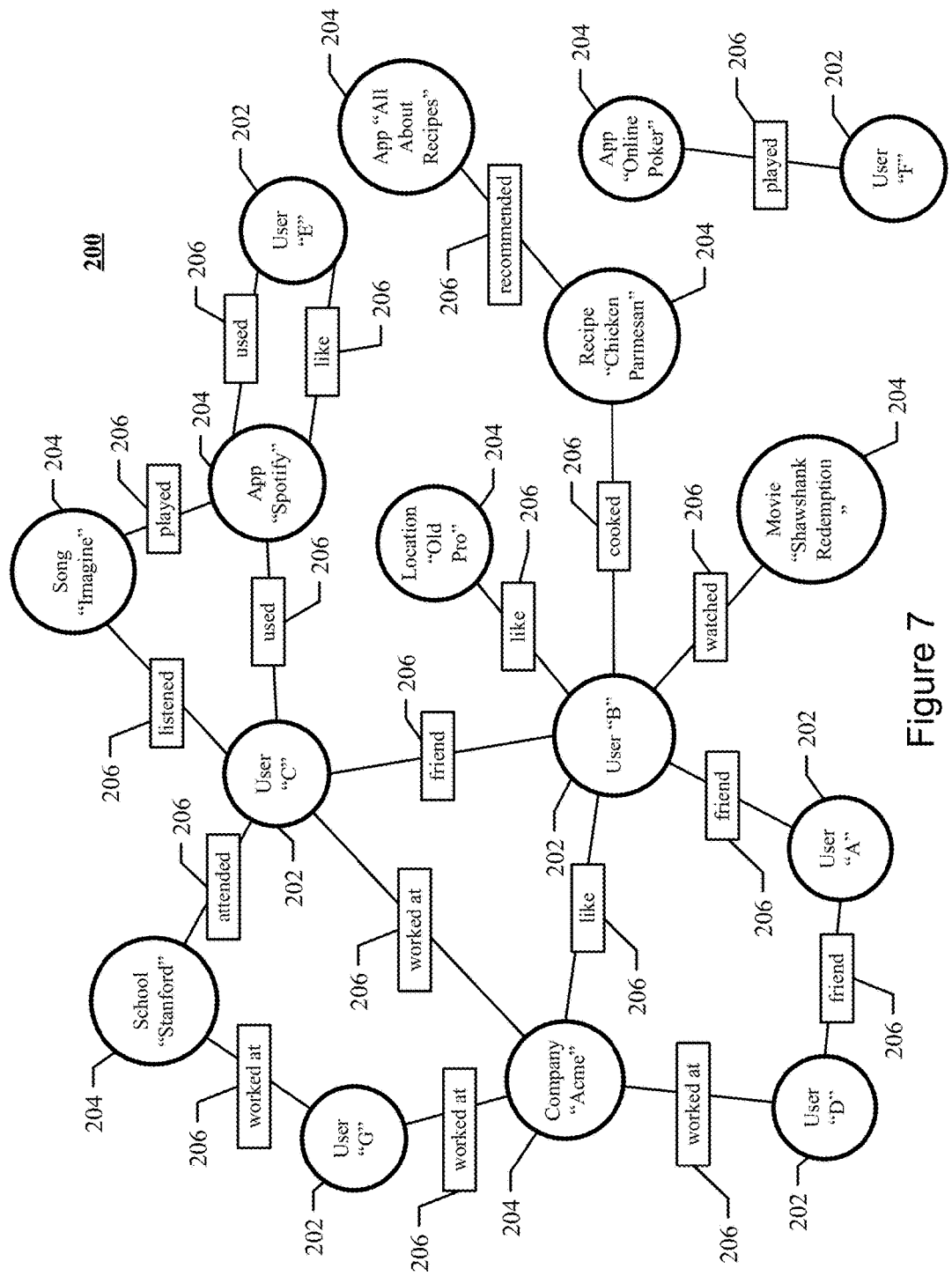
FIG. 7 illustrates an example social graph.

FIG. 7 illustrates an example social graph. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 7 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages. As described above, users associated with user nodes 202 may be classified into particular categories based at least in part on information associated with user nodes 202. As an example and not by way of limitation, users may be categorized based at least in part on age, location, number of friends, or any combination thereof. Furthermore, the users may be classified based on information associated with user nodes 202 in conjunction with other information associated with the users stored in an action log, as described above, such as for example recent actions performed by users on social-networking system 160.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 6, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "like" icon. As another example, the socialized dash of a client system may include a selectable "check in" icon (such as, for example, a clickable "check in" icon) or a selectable "like" icon. Similarly, after a user clicks these icons, social-networking system 160 may create a "like" edge or a "check in" edge in response to a user's action corresponding to a respective action. As described above, the user may be automatically "checked in" at the geolocation associated with a particular concept node 204 based at least in part on the IP address of routers of a communication network and an application of the social-networking system being executed on a client system.

As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 7) between user nodes 202 corresponding to the user and concept nodes 204 corresponding to the song and application to indicate that the user listened to the song and used the application. Moreover, social-networking system 160 may create a "played" edge 206 (as illustrated in FIG. 7) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 6 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 8:
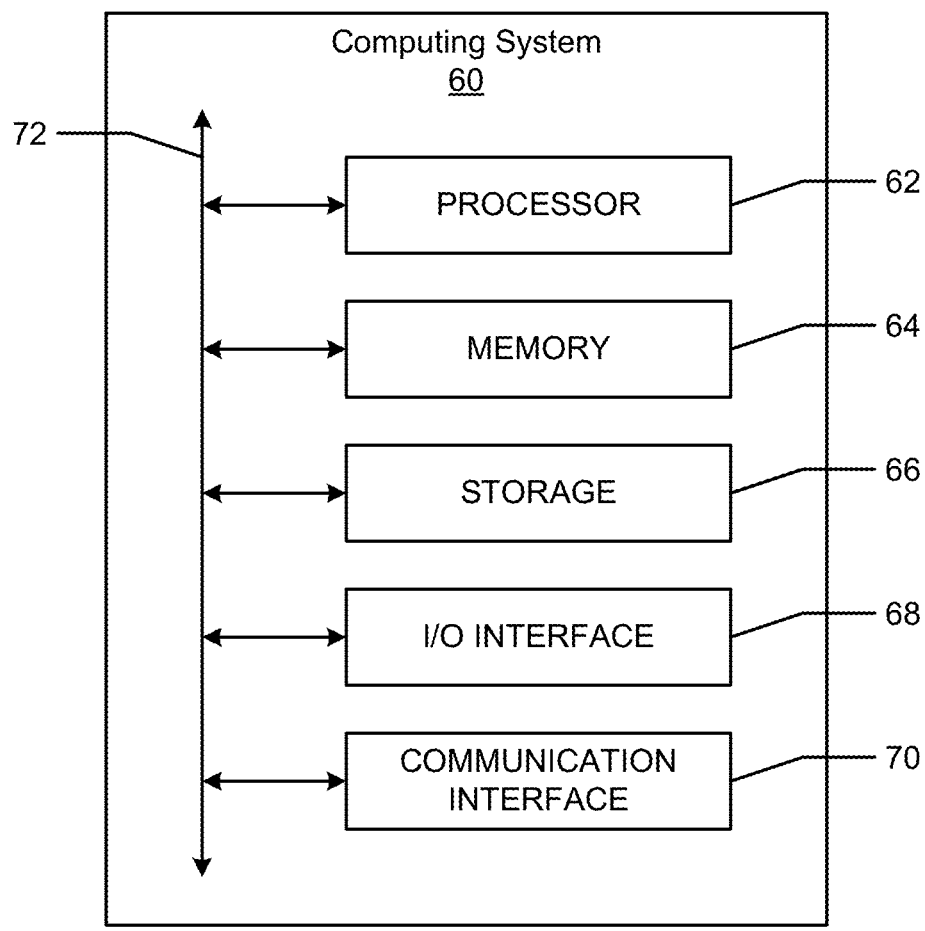
FIG. 8 illustrates an example computing system.

FIG. 8 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile computing system 10, a personal digital assistant (PDA), a server, a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, detecting interception, by a default network resource, of data sent to a communication network;
   by the computing device, in response to the detected interception of data, determining that the communication network is administered by a particular domain associated with an application of the computing device;
   by the computing device, automatically generating a request to access the communication network that identifies a network resource of the particular domain in response to the determination that the communication network is administered by the particular domain associated with the application of the computing device, the network resource of the particular domain being configured to authenticate a user to the particular domain of the communication network; and
   by the computing device, redirecting the request from the default network resource to the network resource of the particular domain.

2. The method of claim 1, wherein:
   the computing device is a client device of a user;
   the default network resource comprises an authentication server; and
   the network resource of the particular domain comprises one or more server computing devices of a social-networking system.

3. The method of claim 1, wherein redirecting the request bypasses a captive network support of a user by a router of the communication network.

4. The method of claim 3, wherein the router is a Wi-Fi access point.

5. The method of claim 3, further comprising automatically checking in a user at a geolocation associated with the router.

6. The method of claim 1, wherein:
   the communication network is the Internet; and
   the particular domain is a second-level domain (SLD) of the Internet.

7. The method of claim 6, wherein the SLD is FACEBOOK.

8. The method of claim 1, wherein the intercepted data corresponds to interactions between the application of the computing device and the default network resource.

9. One or more computer-readable non-transitory storage media embodying software configured when executed to:
   detect interception, by a default network resource, of data sent to a communication network;
   in response to the detected interception of data, determine that the communication network is administered by a particular domain associated with an application of a computing device;
   automatically generate a request to access the communication network that identifies a network resource of the particular domain in response to determining that the communication network is administered by the particular domain associated with the application of the computing device, the network resource of the particular domain being configured to authenticate a user to the particular domain of the communication network; and
   redirect the request from the default network resource to the network resource of the particular domain.

10. The media of claim 9, wherein:
    the computing device is a client device of a user;
    the default network resource comprises an authentication server; and
    the network resource of the particular domain comprises one or more server computing devices of a social-networking system.

11. The media of claim 9, wherein redirecting the request bypasses a captive network support of a user by a router of the communication network.

12. The media of claim 11, wherein the router is a Wi-Fi access point.

13. The media of claim 11, wherein the software is further configured to automatically check in a user at a geolocation associated with the router.

14. The media of claim 9, wherein:
    the communication network is the Internet; and
    the particular domain is a second-level domain (SLD) of the Internet.

15. The media of claim 14, wherein the SLD is FACEBOOK.

16. The media of claim 9, wherein the data sent to a default network resource corresponds to interactions between the application of the computing device and the default network resource.

17. A device comprising:

a processor; and one or more computer-readable non-transitory storage media coupled to the processor and embodying software that is operable when executed to:

detect interception, by a default network resource, of data sent to a communication network;

in response to the detected interception of data, determine that the communication network is administered by a particular domain associated with an application of the device;

automatically generate a request to access the communication network that identifies a network resource of the particular domain in response to determining that the communication network is administered by the particular domain associated with the application of the device, the network resource of the particular domain being configured to authenticate a user to the particular domain of the communication network; and redirect the request from the default network resource to the network resource of the particular domain.

18. The device of claim 17, wherein:

the device is a client device of a user;

the default network resource comprises an authentication server; and the network resource of the particular domain comprises one or more server computing devices of a social-networking system.

19. The device of claim 17, wherein sending the request bypasses a captive network support of a user by a router of the communication network.

20. The device of claim 19, wherein the software is further configured to automatically check in a user at a geolocation associated with the router.

21. The device of claim 19, wherein the router is a Wi-Fi access point.

22. The device of claim 17, wherein:

the communication network is the Internet; and the particular domain is a second-level domain (SLD) of the Internet.

23. The device of claim 22, wherein the SLD is FACEBOOK.

24. The device of claim 17, wherein the intercepted data corresponds to interactions between the application of the device and the default network resource.

* * * * *